Patented Oct. 30, 1923.

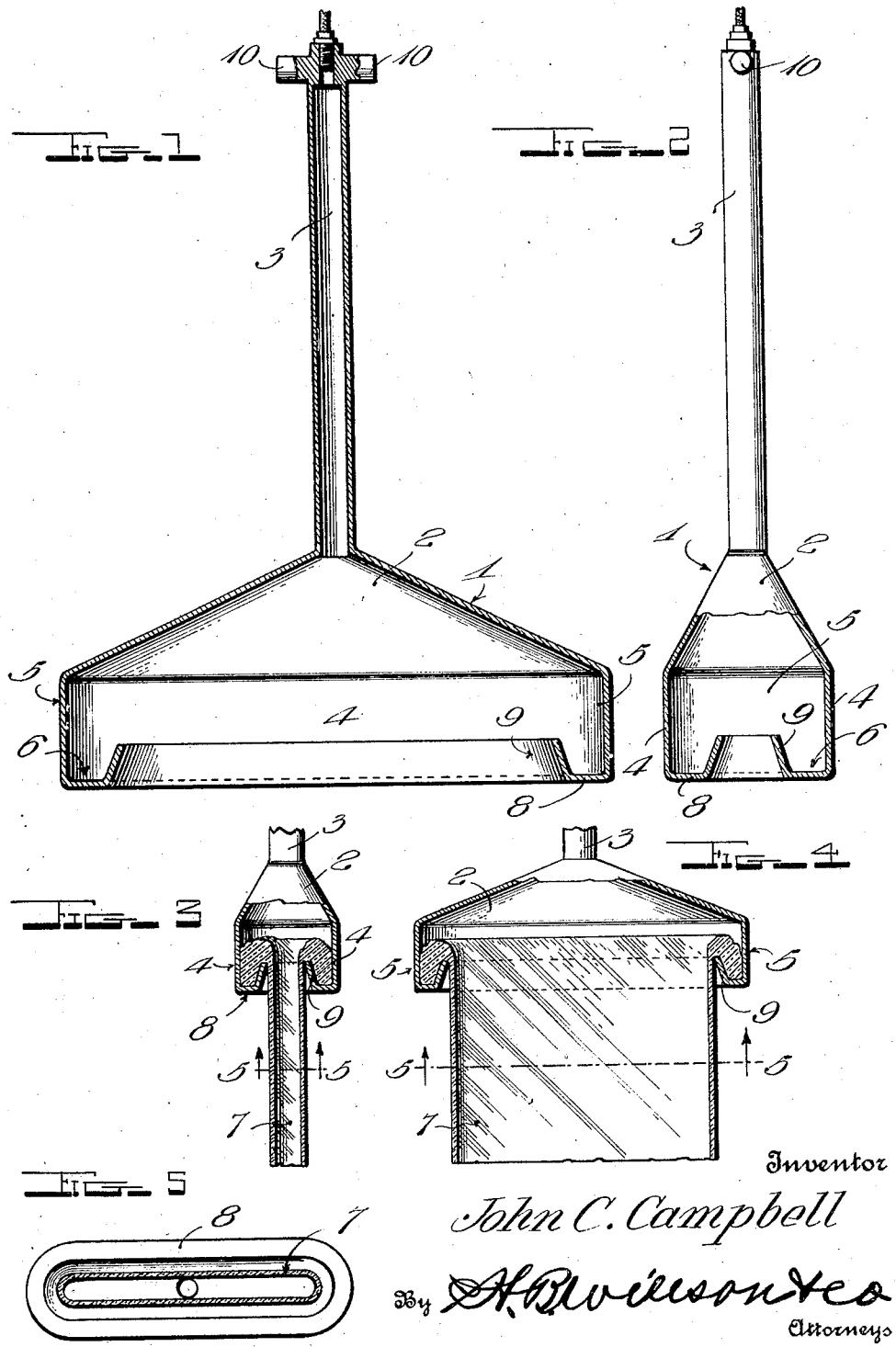

1,472,291

UNITED STATES PATENT OFFICE.

JOHN CARMANY CAMPBELL, OF CLARKSBURG, WEST VIRGINIA.

BLOWPIPE FOR GLASS-MAKING APPARATUS.

Application filed March 8, 1920. Serial No. 364,139.

*To all whom it may concern:*

Be it known that I, JOHN C. CAMPBELL, a citizen of the United States, residing at Clarksburg, in the county of Harrison and State of West Virginia, have invented certain new and useful Improvements in Blowpipes for Glass-Making Apparatus; and I do declare the following to be a full, clear, and exact description of the invention, such as will enable others skilled in the art to which it appertains to make and use the same.

This invention relates to improvements in blow pipes for use in connection with glass making apparatus, that is, apparatus which are employed for making glass tubes and cylinders, and it has more particular reference to a device of this type which is generally known as a "drawing bait," used more particularly for making window-glass and other flat glass plates.

Practically all drawing baits in use at the present time are of cylindrical formation. Consequently the glass drawn by them is in the form of a tube or cylinder. It is a well known fact that in forming these glass cylinders, the bait, which is mounted for vertical movement is lowered down into the molten glass which is contained in a suitable receptacle, and, as the bait includes a channel or pocket at its lower end, upward movement thereof will carry a quantity of glass, in the form of a cylinder, with it. Suitable air supply means is employed for cooling and shaping the cylinder and maintaining a uniform diameter. Because of this cylindrical formation of the glass, it is necessary before making the same into flat plates, to put it through a process known as "flattening." This procedure is necessarily very expensive, due to the added time it consumes and the mechanical skilled laborers it requires to carry it out. It is therefore objectionable, and should be overcome.

It is therefore my intention and the object of this invention to provide a blow-pipe or drawing bait for the above mentioned purpose which will obviate, to a great extent, the necessity of the flattening process, the desired result being accomplished by a device which is of such design and shape that it will draw a substantially rectangular tube instead of a cylindrical tube. In this way the draw will include two flat sheets which, when separated, will need little or no flattening as is otherwise necessary.

Another object of the invention is to generally improve upon devices of this type by greatly simplifying the construction and reducing the cost of manufacture, yet increasing the effectiveness of operation to such an extent that the output will be nearly doubled.

A further and important object of the invention is to provide a device of the above mentioned character which may be easily and readily installed upon conventional types of glass making machines now in use without altering such machines in any way whatsoever.

Other objects and advantages of the invention will be apparent during the course of the following description.

In the accompanying drawings forming a part of this specification, and in which like numerals are employed to designate like parts throughout the same:

Figure 1 is a central vertical, longitudinal sectional view, partly in elevation, of a blowpipe or bait constructed in accordance with my invention.

Fig. 2 is an end elevation, partly in section thereof.

Fig. 3 is a view similar to Fig. 1 showing the glass tube associated with the device.

Fig. 4 is a view similar to Fig. 1, disclosing the manner in which the glass tube is associated with the device.

Fig. 5 is a section taken on the plane of the line 5—5 of Figs. 3 and 4.

In carrying out my invention I make use of a hollow head or body member, designated as a whole by the numeral 1. It includes a substantially long, narrow downwardly tapered top portion 2 which has communication with an air supply pipe 3 which is preferably made integral therewith. It further includes spaced flat side walls 4, which are joined by arcuate or curved end walls 5, the lower ends of the side and end walls carrying an internal channel 6, which is so designed that it permits easy and ready removal of the novel of the glass tube 7. To this end, I design the channel in such a way that it includes a flat horizontally disposed bottom 8 and an inwardly and upwardly directed wall 9. As before stated, the device is to be designed in such a way that it may be readily connected to the conventional types of glass-making machines in use at the present time. To this end, I provide oppositely disposed journals 10 for reception in suitable bearings on the vertically removable cage (not shown) of a glass-making machine. While I have shown journals as a means for connecting my device with the cage, I desire it to be understood that any other suitable means may be employed for the purpose.

In operation, the device will be removably attached to the vertically movable cage of the glass-making machine either by means of the journals which I have shown or by other suitable means which would equally well serve the purpose. The device is then lowered toward the molten glass which is contained in a suitable receptacle far enough to cause the channel 6 to become filled with the liquid glass, after which it will overflow. Then the device is moved vertically either slow or fast according to the thickness desired to be imparted to the draw, in the usual manner. When it has been raised sufficiently high to obtain a desired length of tube, the bait and tube will be removed from the cage. The tube drawn by the device will be substantially rectangular instead of cylindrical, thus providing two opposed flat plates of glass which may be separated by severing the curved or arcuate ends which join them. It is of course understood that before the plates of glass are formed in this manner it is necessary to remove the tube from the bait by suitable means. Such removal of the tube from the bait ordinarily leaves a deposit of hardened glass in the channel 6 and this deposit must necessarily be removed before the device is again placed in operation. The manner in which I form my channel will facilitate in such removal of this deposit of glass which is generally known as the "novel". It is also to be understood that during the drawing operation, a limited supply of air will be fed downward through the blow-pipe 3 in order to insure uniform and proper spacing of the walls of the draw.

A device constructed in accordance with my invention will be found extremely advantageous in glass-making plants and the like, in that the out-put may be nearly doubled, by reason of the fact that the flattening process is practically eliminated. This is true because the shape of the tube which is drawn by my device includes two flat sheets of glass instead of a plurality of arcuate pieces and no flattening is necessary. The construction of the device is extremely simple, and it may be effectively installed upon many conventional types of glass-making apparatus now in use without altering the latter in any way.

I am aware that a device has been patented for obtaining practically the same result that my device obtains. This device, however, is entirely different in construction from mine. It is a machine, while mine is a mere blow-pipe or drawing bait of extreme simplicity. That device includes many parts while mine is a unitary structure. Consequently, there is little or no likeness between my device and the device under consideration.

Upon carefully considering the foregoing description taken in connection with the accompanying drawings, it is believed that persons skilled in the art to which this invention relates, will be able to understand the operation and advantages of my device. Hence, a more lengthy description is deemed unnecessary.

I claim:

A device of the character described comprising a hollow body open at its lower end, said body having oppositely disposed flat walls positioned close together and connected at their ends, an inwardly extending horizontally disposed flange at the lower end of the walls of said body terminating in an inwardly and upwardly extending lip, and an air pipe extending from the top portion of said body.

In testimony whereof I have hereunto set my hand.

JOHN CARMANY CAMPBELL.